Figure 1:
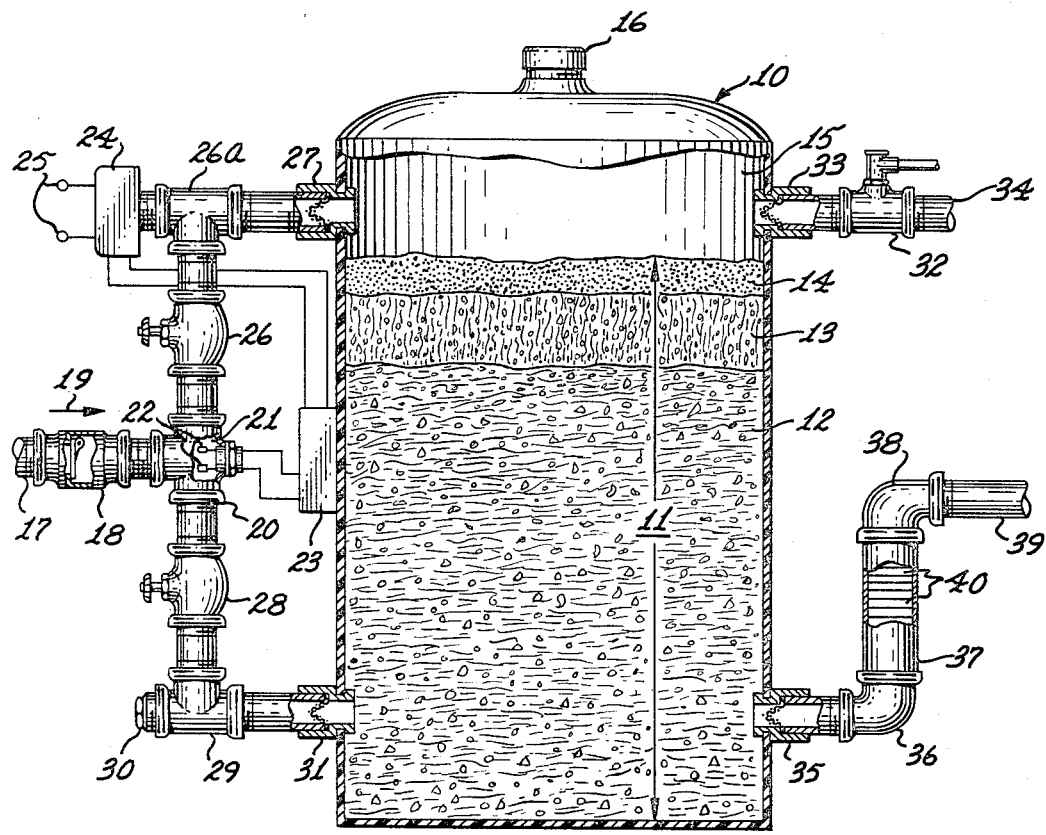

April 23, 1968  J. P. O'BRIEN  3,379,637
ELECTROMAGNETIC WATER CONDITIONER
Filed July 6, 1965

INVENTOR.
JOHN P. O'BRIEN
BY
Willard S. Groent
ATTORNEY

United States Patent Office 3,379,637
Patented Apr. 23, 1968

3,379,637
ELECTROMAGNETIC WATER CONDITIONER
John P. O'Brien, Box 194, Arizona City, Ariz. 85223
Filed July 6, 1965, Ser. No. 469,675
4 Claims. (Cl. 204—309)

This invention pertains to electromagnetic water conditioning and purifying apparatus.

One of the objects of this invention is to provide an electromagnetic water purifier which does not need the addition of salt or chemicals of any kind.

Still another object of this invention is to provide an electromagnetic water purifier or softener which saves the expense of buying salt or any chemical for recharging the unit.

It is also an object of this invention to provide a water purifier and softening apparatus which does not release salt brine into the sewerage system or septic tank so as to avoid the problem of the brine killing the friendly bacteria in sewerage plants and septic tanks while complying with the law of many cities which are stopping the installation of further water softeners for this reason and placing a time limit on the use of already installed.

And it is a further object of this invention to provide an improved electromagnetic water purifier and softener in which the salt, some of which remains in the water that comes from the unit, in former devices which makes it impossible to use this water for watering house plants, drinking water for birds, for use in aquariums, or for human consumption, is avoided.

It is also an object of this invention to provide an electromagnetic water softener and purifier device in which the water discharged therefrom is at all times favorable to irrigation of plants and shrubs and that the water coming from the apparatus of this invention actually promotes growth, intensifies color, and aids in growing hardy vegetation and healthy pets.

It is also an object of this invention to provide an electromagnetic water purifier which produces a soft water that rinses free of soap, detergents and the like more quickly and thoroughly than water from former sources and equipment for conditioning water.

An object of this invention is also to provide an electromagnetic water purifier which produces a water that is free of impurities to which other impurities can claim.

It is also an object to provide an electromagnetic water softening apparatus which removes from the water the impurities which are in suspension and in addition removes the impurities which are in solution.

Still another object of this invention is to provide a water conditioning apparatus which provides a water output which is a living, active water, and in which the minerals remaining in the water have become colloidal or active and are thus made available to plant and animl life, in a healthful, satisfactory form of water.

It is also an object of this invention to provide a water conditioning apparatus which produces water which is active and a "wetter" type of water so that in irrigation it will sub up over a hill or row that is built up around the plants and reach the plants successfully for proper irrigation and will take less water to irrigate as no water is wasted in poor penetration.

Further features and advantages of this invention will appear from a detailed description of the drawings in which:

FIG. 1 illustrates an example of one arrangement of this invention and the piping and control circuits associated therewith.

As an example of one embodiment of this invention, there is shown an electromagnetic water conditioner comprising a tank 10 constructed of insulative plastic materials which is provided with a filter bed 11 having a lower section 12 of quartz and graphite, an intermediate section 13 of activated charcoal, a top section 14 of green sand, above which is the gas chamber 15 having a filter fill plug 16 at the top of the tank 10. A source of raw water to be treated is supplied by the pipe 17 connected to the check valve 18 which limits flow to the direction indicated by the arrow 19 which in turn is connected into the side of the T fitting 20 having an electrode chamber 21 in which are positioned a pair of low voltage electrodes 22 connected to the output of a suitable transformer 23 connected through a suitable pressure switch 24 in turn connected to a suitable source of electrical power 25.

The upper end of the T fitting 20 is connected through a manual shut-off valve 26 in turn connected to the side of the T fitting 26 having one of its ends connected to the pressure switch 24 and its other end connected to the port 27 of the tank 10. The lower end of the T fitting 20 is connected to the manual shut-off valve 28 in turn connected to the T fitting 29 having a drain plug 30 in its outer end and connected at its other end to the port 31 of the tank 10.

A back wash discharge valve 32 is connected to the port 33 of the tank 10 and discharges into the back wash discharge line 34. Filtered water discharge port 35 is connected to the input fitting 36 of the magnetic field chamber 37 having a series of permanent magnets 40 therein, in turn connected to the output fitting 38 attached to the treated and purified water supply line 39.

In operation: With valve 26 open and valves 28 and 32 closed, water enters from line 17 at the electrode chamber 21 where the hydrogen is released. It then passes through the filter bed 11 from top down to the bottom, both the gases and the water. It then passes through the magnetic field chamber 37 which converts the gases to electrical energy and these in turn keep the filter bed 11 energized so that it never needs replacing. Eighty-eight percent of the impurities are converted to gases and eliminated in this manner. The balance crystallize and are held in the filter materials 12, 13 and 14 which acts as an electrical grid until they are backwashed out by closing valve 26 and opening valves 29 and 32.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An electromagnetic water conditioner comprising in combination:
(A) a tank,
(B) a filter bed in said tank comprising,
(C) a lower section of quartz and graphite,
(D) an intermediate section of activated charcoal,
(E) and a top section of green sand,
(F) a gas chamber in said tank above said filter bed,
(G) an input port at the top of said tank communicating with said gas chamber,
(H) a raw water supply pipe,
(I) an electrode chamber connected between said raw water supply pipe and said input port,
(J) a filtered water discharge port at the bottom of said tank communicating with the bottom of said lower quartz and graphite section of said filter bed,
(K) a treated and purified water supply line, (L) and a magnetic field chamber connected between said filtered water discharge port and said treated and purified water supply line.

2. An electromagnetic water conditioner comprising in combination:
(A) a tank,
(B) a filter bed in said tank comprising,
(C) a lower section of quartz and graphite,
(D) an intermediate section of activated charcoal,
(E) and a top section of green sand,
(F) a gas chamber in said tank above said filter bed,
(G) an input port at the top of said tank communicating with said gas chamber,
(H) a raw water supply pipe,
(I) an electrode chamber connected between said raw water supply pipe and said input port,
(J) a filtered water discharge port at the bottom of said tank communicating with the bottom of said lower quartz and graphite section of said filter bed,
(K) a treated and purified water supply line,
(L) a magnetic field chamber connected between said filtered water discharge port and said treated and purified water supply line,
(M) a back wash input port at the bottom of said tank communicating with said lower quartz and graphite section,
(N) a back wash discharge valve connected at the top of said tank into said gas chamber,
(O) valve means for directing the flow from said electrode chamber either to said input port of said gas chamber or said back wash input port.

3. An electromagnetic water conditioner comprising in combination:
(A) a tank,
(B) a filter bed in said tank comprising,
(C) a lower section of quartz and graphite,
(D) an intermediate section of activated charcoal,
(E) and a top section of green sand,
(F) a gas chamber in said tank above said filter bed,
(G) an input port at the top of said tank communicating with said gas chamber,
(H) a raw water supply pipe,
(I) an electrode chamber connected between said raw water supply pipe and said input port,
(J) a filtered water discharge port at the bottom of said tank communicating with the bottom of said lower quartz and graphite section of said filter bed,
(K) a treated and purified water supply line,
(L) a magnetic field chamber connected between said filtered water discharge port and said treated and purified water supply line,
(M) a back wash input port at the bottom of said tank communicating with said lower quartz and graphite section,
(N) a back wash discharge valve connected at the top of said tank into said gas chamber,
(O) valve means for directing the flow from said electrode chamber either to said input port of said gas chamber or said back wash input port,
(P) electrodes in said electrode chamber,
(Q) and a source of electrical energy for energizing said electrodes.

4. An electromagnetic water conditioner comprising in combination:
(A) a tank,
(B) a filter bed in said tank comprising,
(C) a lower section of quartz and graphite,
(D) an intermediate section of activated charcoal,
(E) and a top section of green sand,
(F) a gas chamber in said tank above said filter bed,
(G) an input port at the top of said tank communicating with said gas chamber,
(H) a raw water supply pipe,
(I) an electrode chamber connected between said raw water supply pipe and said input port,
(J) a filtered water discharge port at the bottom of said tank communicating with the bottom of said lower quartz and graphite section of said filter bed,
(K) a treated and purified water supply line,
(L) a magnetic field chamber connected between said filtered water discharge port and said treated and purified water supply line,
(M) a back wash input port at the bottom of said tank communicating with said lower quartz and graphite section,
(N) a back wash discharge valve connected at the top of said tank into said gas chamber,
(O) valve means for directing the flow from said electrode chamber either to said input port of said gas chamber or said back wash input port,
(P) electrodes in said electrode chamber,
(Q) a source of electrical energy for energizing said electrodes,
(R) and a series of permanent magnets exposed to the water flow in said magnetic field chamber.

References Cited

UNITED STATES PATENTS

| | | | |
|---|---|---|---|
| 531,183 | 12/1894 | Harris | 210—222 |
| 1,831,076 | 11/1931 | Neeley | 204—276 |
| 2,652,925 | 9/1953 | Vermeiren | 204—155 |
| 3,095,365 | 6/1963 | Green | 204—149 |

HOWARD S. WILLIAMS, *Primary Examiner.*

T. TUFARIELLO, *Assistant Examiner.*